US009856858B2

(12) United States Patent
Mazur

(10) Patent No.: US 9,856,858 B2
(45) Date of Patent: *Jan. 2, 2018

(54) SYSTEM AND METHODOLOGY FOR A WIND TURBINE

(71) Applicant: Regenedyne LLC, Sierra Vista, AZ (US)

(72) Inventor: Ed Mazur, Hereford, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/854,736

(22) Filed: Apr. 1, 2013

(65) Prior Publication Data

US 2014/0203565 A1  Jul. 24, 2014

Related U.S. Application Data

(63) Continuation of application No. 12/215,232, filed on Jun. 26, 2008, now Pat. No. 8,513,826.

(51) Int. Cl.
| | | |
|---|---|---|
| F03D 9/00 | (2006.01) |
| H02P 9/04 | (2006.01) |
| F03D 3/04 | (2006.01) |
| F03D 11/00 | (2006.01) |
| F16C 39/06 | (2006.01) |
| F16C 32/04 | (2006.01) |
| F03D 3/00 | (2006.01) |
| H02K 7/09 | (2006.01) |

(52) U.S. Cl.
CPC ............. *F03D 9/002* (2013.01); *F03D 3/005* (2013.01); *F03D 3/0418* (2013.01); *F03D 3/0472* (2013.01); *F03D 9/003* (2013.01); *F03D 11/0008* (2013.01); *F16C 32/0431* (2013.01); *F16C 39/066* (2013.01); *H02K 7/09* (2013.01); *F05B 2240/511* (2013.01); *F05B 2240/941* (2013.01); *Y02B 10/30* (2013.01); *Y02E 10/74* (2013.01)

(58) Field of Classification Search
CPC .. F05B 2240/51; Y02E 10/74; F03D 11/0008; F03D 1/025; F03D 3/005; H02K 7/09; H02K 7/183; Y02B 10/30; Y02T 10/7083; F16F 15/03; F16C 39/063
USPC ...................................... 290/44, 55
See application file for complete search history.

(56) References Cited

U.S. PATENT DOCUMENTS

| | | | | |
|---|---|---|---|---|
| 3,888,553 A | * | 6/1975 | Wehde | 310/90.5 |
| 4,379,598 A | * | 4/1983 | Goldowsky | 310/90.5 |
| 5,218,257 A | * | 6/1993 | Tozoni | 310/90.5 |
| 5,470,208 A | * | 11/1995 | Kletschka | 417/356 |
| 5,541,460 A | * | 7/1996 | Dunfield et al. | 310/67 R |
| 5,574,322 A | * | 11/1996 | Nii et al. | 310/90.5 |
| 5,578,882 A | * | 11/1996 | Dunfield et al. | 310/90.5 |
| 5,610,463 A | * | 3/1997 | Dunfield et al. | 310/90.5 |
| 5,619,083 A | * | 4/1997 | Dunfield et al. | 310/90.5 |
| 5,856,719 A | * | 1/1999 | De Armas | 310/103 |
| 6,034,454 A | * | 3/2000 | Ichiyama | 310/90 |
| 6,215,218 B1 | * | 4/2001 | Ueyama | 310/90.5 |
| 6,268,673 B1 | * | 7/2001 | Shah et al. | 310/90.5 |
| 6,731,038 B2 | * | 5/2004 | Kuipers et al. | 310/90.5 |

(Continued)

*Primary Examiner* — Pedro J Cuevas
(74) *Attorney, Agent, or Firm* — Van Dyke Law; Raymond Van Dyke

(57) ABSTRACT

A wind turbine having discrete sets of magnets on the turbine support and the turbine rotor, creating repelling forces and spaces therebetween. The reduction of friction between the turbine rotor and the turbine support allows for an increase in energy production and scale of the wind turbines.

41 Claims, 5 Drawing Sheets

(56) References Cited

U.S. PATENT DOCUMENTS

| | | | | |
|---|---|---|---|---|
| 6,745,767 | B2* | 6/2004 | Kullik et al. | 128/204.19 |
| 6,836,042 | B2* | 12/2004 | Kuipers et al. | 310/90.5 |
| 6,861,778 | B2* | 3/2005 | Izraelev | 310/90.5 |
| 6,914,361 | B2* | 7/2005 | Beyer et al. | 310/90.5 |
| 7,052,253 | B2* | 5/2006 | Izraelev | 417/423.12 |
| 7,135,798 | B2* | 11/2006 | Wang et al. | 310/90.5 |
| 7,252,001 | B2* | 8/2007 | Boletis et al. | 73/514.17 |
| 7,315,100 | B2* | 1/2008 | Chen et al. | 310/90.5 |
| 2003/0197439 | A1* | 10/2003 | Kuipers et al. | 310/90.5 |
| 2003/0201644 | A1* | 10/2003 | Kaploun | 290/43 |
| 2004/0041406 | A1* | 3/2004 | Seki | 290/54 |
| 2004/0135451 | A1* | 7/2004 | Kuipers et al. | 310/90.5 |
| 2010/0109463 | A1* | 5/2010 | Jiang et al. | 310/90.5 |
| 2010/0126374 | A1* | 5/2010 | Ji | 104/282 |
| 2012/0235516 | A1* | 9/2012 | Cardon | 310/14 |
| 2014/0105722 | A1* | 4/2014 | Mazur | 415/1 |
| 2014/0105724 | A1* | 4/2014 | Mazur | 415/4.2 |

\* cited by examiner

SYSTEM AND METHODOLOGY FOR A WIND TURBINE

CROSS REFERENCE TO RELATED APPLICATIONS

The present invention is a continuation of U.S. patent application Ser. No. 12/215,233, entitled "Wind Turbine," filed Jun. 26, 2008, and related to U.S. patent application Ser. No. 12/215,232, entitled "Wind Compressor," also filed Jun. 26, 2008, the subject matters of which are incorporated by reference herein.

FIELD OF INVENTION

The field of invention relates to a wind turbine having one or more sets of magnets for reducing friction between a turbine rotor and a turbine support.

BACKGROUND OF THE INVENTION

Wind turbines harness the kinetic energy of the wind and convert it into mechanical or electric power. Traditional wind turbines have a horizontal spinning axis that allowed blades of the wind turbine to rotate around the axis. As wind engages the blades, the blades move around the horizontal spinning axis of the wind turbine. The relative rotation of the blades to the horizontal axis may then be converted into energy.

Recently vertical axis wind turbines have been used to harness the kinetic energy of the wind. Vertical axis wind turbines operate in the same manner as horizontal axis wind turbines; however, the axis is a vertical plane and the blades spin around the vertical axis. During the operation of the horizontal axis and vertical axis wind turbines, energy is lost during the process as the mechanical pieces of the windmill lose energy to friction forces. Further, the friction between the moving parts creates maintenance problems which require frequent and costly repairs.

SUMMARY OF THE INVENTION

The present invention increases the efficiency of a wind turbine because the friction occurring between the parts of a wind turbine is significantly reduced. The wind turbine of this invention comprise a turbine rotor, a turbine support, one or more blades coupled to the turbine rotor, the one or more blades configured to move the turbine rotor relative to the turbine support. The significant improvement in efficiency is attributed to one or more magnet sets located between the turbine support and the turbine rotor. The one or more magnet sets create a space between at least a portion of the turbine rotor and a portion of the turbine support. Alternatively, the space created by the magnet is between the entire turbine rotor and the entire turbine support. The rotational movement of the turbine rotor is essentially frictionless and minimal energy is expended during rotation of the turbine blades. The energy output produced by the turbine rotor is transmitted to one or more generators that are configured to generate electric power from the rotational movement of the turbine rotor.

In one embodiment of this invention, a wind turbine comprises a vertical turbine rotor for rotating around a core axis, the turbine rotor comprising a central axis. A vertical turbine support lies within and concentric to the turbine support for rotating in relation to the turbine rotor, the turbine support comprising a support shaft. The support shaft is positioned radially inside the central axis. One or more blades are coupled to the turbine rotor, the one or more blades configured to increase wind energy by rotating the turbine rotor relative to the turbine support. Advantageously, one or more sets of magnets positioned on a side of the turbine support adjacent the turbine rotor and one or more sets of magnets are positioned on a side of the central axis adjacent the turbine support. The turbine support magnets create an opposing force to the turbine rotor magnets In another aspect of this invention, a space is defined between at least a portion of the turbine rotor and a portion of the turbine support, wherein the space is created by the opposing forces of the one or more magnet sets. The space helps to reduce the friction between the rotating turbine rotor and the turbine support. One or more generators are configured to generate electric power in response to the movement of the turbine rotor relative to the turbine support.

In one aspect of this invention, the turbine support further comprises a support shaft and a base. The base further comprises a platform located substantially under a bottom of the turbine rotor. One or more magnet sets further comprise one or more levitation magnet sets, wherein the one or more levitation magnet sets are configured to form the space between the platform of the turbine support and the bottom of the turbine rotor. Alternatively the one or more magnet sets can comprise one or more stabilization magnet sets. The one or more stabilization magnet sets are configured to form the space between the support shaft and the turbine rotor.

The one or more generators have a generator gear; and a turbine gear, wherein the turbine gear is configured to move the generator gear. To further improve efficiency of the wind turbine, a magnetic gear connection is present between the generator gear and the turbine gear. The magnetic gear connection is configured to move the generator gear with reduced friction between the turbine gear and the generator gear. The one or more generators can comprise at least one linear synchronous generator.

The turbine rotor comprises a central axis, a bottom; and a top. In one embodiment of this invention, the bottom and the top extend substantially radially away from the central axis. One or more blades may comprise a poly-carbon material and extend substantially between the top and the bottom of the turbine rotor.

In an alternative embodiment of a wind turbine, the wind turbine comprises a turbine rotor, a turbine support; and one or more blades coupled to the turbine rotor, the one or more blades configured to move the turbine rotor relative to the turbine support in response to wind engaging and rotating the one or more blades. This embodiment of the wind turbine also comprises one or more magnet sets located between the turbine support and the turbine rotor, the one or more magnets positioned on the turbine support and/or the turbine rotor to create a space between the turbine support and the turbine rotor thereby reducing friction between the turbine support and the turbine rotor. One or more generators are configured to generate electric power in response to the relative rotational movement between the turbine rotor and the turbine support frame. The turbine support frame further comprises a base located below the turbine rotor, a support shaft located along a central axis of the turbine rotor and a top configured to cover a substantial portion of the turbine rotor and the one or more blades. Advantageously, the wind turbine of this embodiment has a top that further comprises an observation deck for one or more persons to access. The support shaft has an interior access way configured to allow the one or more persons to travel to and from the observation deck. The interior access way can comprises an elevator for easy access.

In one embodiment, the wind turbine may have a transport device located beneath the turbine support and configured to move the wind turbine to and from remote sites. The transport device may comprise a trailer.

In a method for generating electricity, advantageously, the method comprises lifting a vertical turbine rotor off of a turbine support using one or more sets of magnets thereby reducing the friction between the vertical turbine rotor and the turbine support. As one or more blades coupled to the vertical turbine rotor engage with wind, the vertical turbine rotor rotates relative to the turbine support and the mechanical energy of the moving vertical turbine rotor is converted into electric power using a generator. The one or more sets of magnets are used to create a space between the vertical turbine rotor and the turbine support. In this method, the turbine support further comprises a support shaft and a base, the base further comprising a platform located substantially under a bottom of the turbine rotor and the method further comprises using one or more levitation magnet sets positioned on the platform adjacent the bottom of the turbine rotor and one or more levitation magnet sets positioned on the bottom of the turbine rotor adjacent to the platform, wherein the one or more levitation magnet sets on the platform and the one or more levitation magnet sets on the bottom of the turbine rotor create an opposing force resulting in a space between the turbine rotor and the turbine support.

A turbine gear is mechanically coupled to the vertical turbine rotor that is proximate a generator gear and mechanically coupled to the generator. The rotation of the turbine gear is transmitted to the generator gear causing the generator gear to rotate. Rotating the generator gear further comprises engaging the generator gear with a magnetic force between the turbine gear and the generator gear.

In an alternative method for generating electricity, a set of dipolar magnets is coupled to a turbine rotor and a turbine support. The set of dipolar magnets is used to create a space between the turbine rotor and turbine support thereby reducing the friction force between the turbine rotor and the turbine support. In this way, the mechanical energy of the moving turbine rotor is converted into electric power using a generator with greater efficiency resulting in a significant increase in electrical power by each wind turbine.

DETAILED DESCRIPTION

Figure 1A:
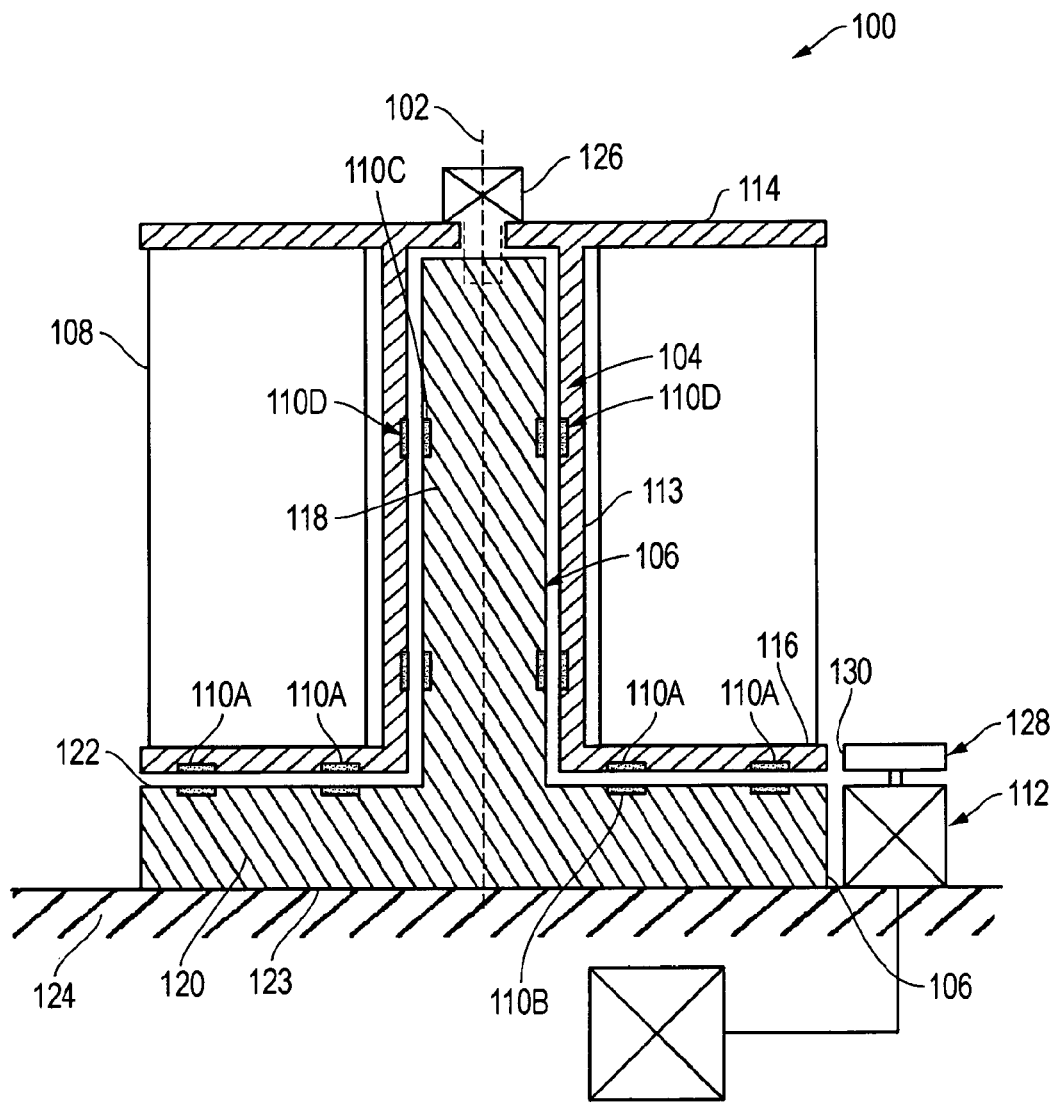
FIG. 1A is a schematic cross-sectional view of a wind turbine according to one embodiment.

FIG. 1A is a schematic cross sectional view of a wind turbine 100, according to one embodiment. The wind turbine 100, as shown, is a vertical axis wind turbine. Therefore, a core axis 102 of the wind turbine 100 is substantially in a vertical plane relative to the Earth. The wind turbine 100 may have a turbine rotor 104 and a turbine support 106 within and concentric to the turbine rotor 104. The turbine rotor 104 rotates around the core axis 102 of the turbine support 106 in response to wind engaging one or more blades 108, shown schematically. The kinetic energy from the wind is captured by the blades 108 thereby rotating the turbine rotor 104. The turbine core support 106 may remain stationary as the turbine rotor 104 rotates around the axis 102. In order to reduce the effects of friction between the rotating turbine rotor 104 and the turbine support 106, one or more sets of magnets 110 are used to reduce the weight force of the turbine rotor 104 acting on the turbine support 106. A generator 112 may be located proximate the wind turbine 100 in order to convert the mechanical energy of the rotating turbine rotor 104 into electric power.

Figure 1B:
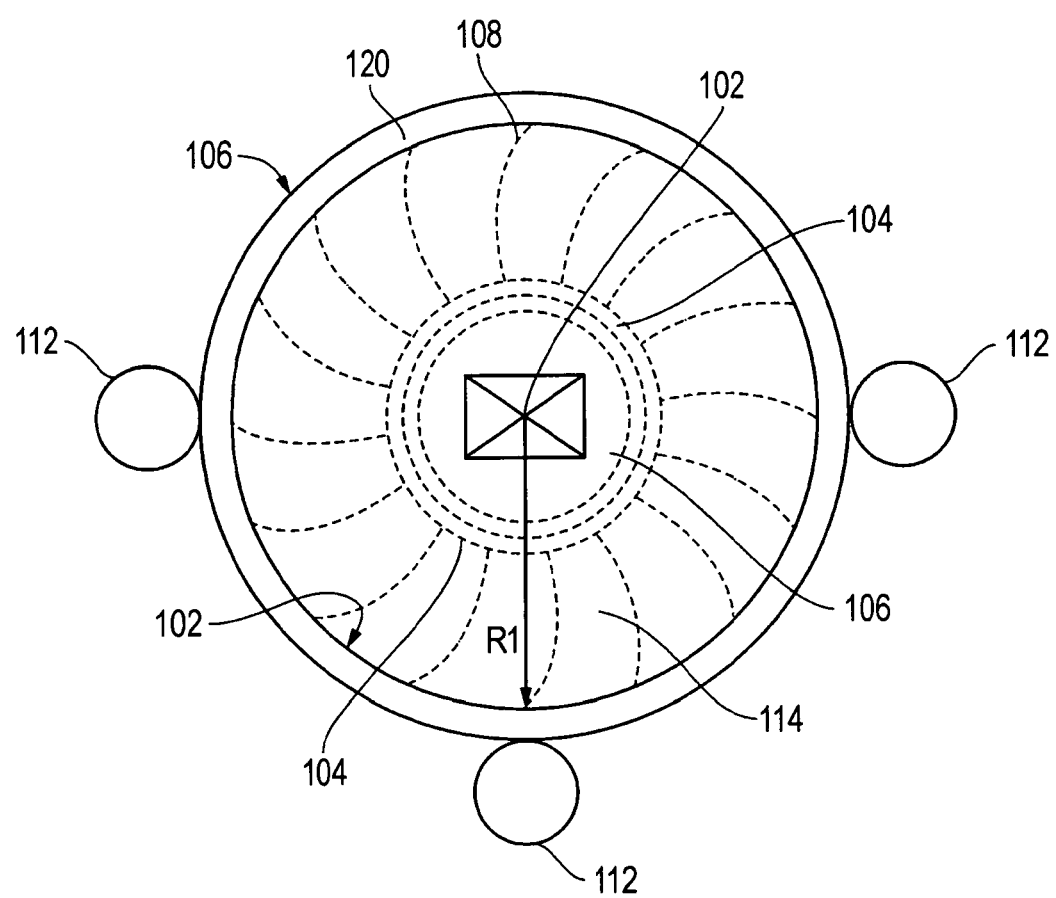
FIG. 1B is a schematic top view of a wind turbine according to one embodiment.

The turbine rotor 104, as shown in FIG. 1A, comprises a central axis 113 that is substantially centered around the axis 102. The turbine rotor 104, may include a top 114 and a bottom 116 extending out from the central axis 113. As shown, the central axis 113 supports the top 114 and the bottom 116. The top 114 and/or the bottom 116, as shown, extends radially away from the central axis 113. In FIG. 1B a top view of the wind turbine 100 is shown. The top view shows the top 114 extending a first radius R1 away from the axis 102. The bottom 116 may extend the same distance as the top 114 from the axis 102; however, it should be appreciated that the distance the top 114 and bottom 116 extend from the axis 102 may vary depending on design conditions. The top 114, as shown in FIGS. 1A and 1B, extends over the top of a support shaft 118 of the turbine support 106; however, it should be appreciated that other suitable configurations for the top 114 may be used.

Figure 2:
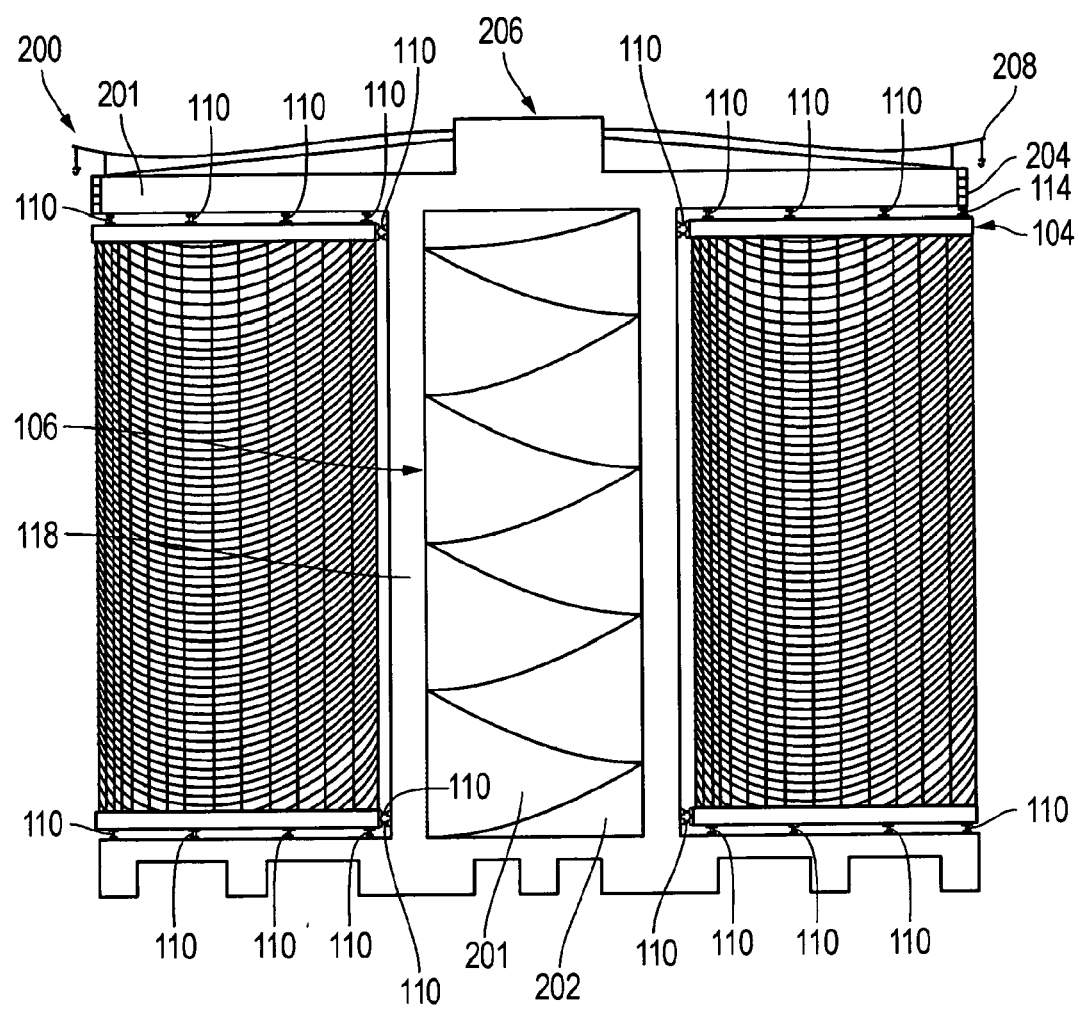
FIG. 2 is a schematic cross-sectional view of a wind turbine according to one embodiment.

The turbine rotor 104 may have alternative designs to the one shown in FIG. 1. For example, the turbine rotor 104 may not cover the top of the support shaft 118, as shown in FIG. 2. Further, the turbine rotor 104 may simply include the top 114 and the bottom 116 and be held together by the blades 108. Further still, the top 114 and/or the bottom 116 may not be shaped in a circular pattern, but instead may extend as supports over each of the blades 108 in an effort to save money on materials and reduce the weight of the turbine rotor 104. The turbine rotor 104 may have any suitable design capable of supporting the blades 108 and rotating around the axis 102.

The bottom 116 of the turbine rotor 104 may include one or more of the magnets 110. The one or more magnets 110 located in the bottom 116 of the turbine rotor 104 provide an opposing force against one or more magnets 110 located on the turbine support 106. The opposing force created by the one or more magnets 110 reduces the weight load of the turbine rotor 104 on the turbine support 106, as will be discussed in more detail below.

The turbine support 106 may be any suitable shape capable of supporting the weight of the turbine rotor 104 and stabilizing the turbine rotor 104 as it rotates about the axis 102. The turbine support 106, as shown in FIG. 1A, includes a base 120 and the support shaft 118. The base 120 may rest under the bottom 116 of the turbine rotor 104. The base 120 typically acts as a support between a surface 124, such as the ground or bed rock, and the turbine rotor 104. The base 120 may include a platform 122 adjacent the turbine rotor 104 and a bottom member 123 adjacent the surface 124. The base 120 may be any suitable shape so long as the base is capable of supporting the weight of the turbine rotor 104.

Figure 3:
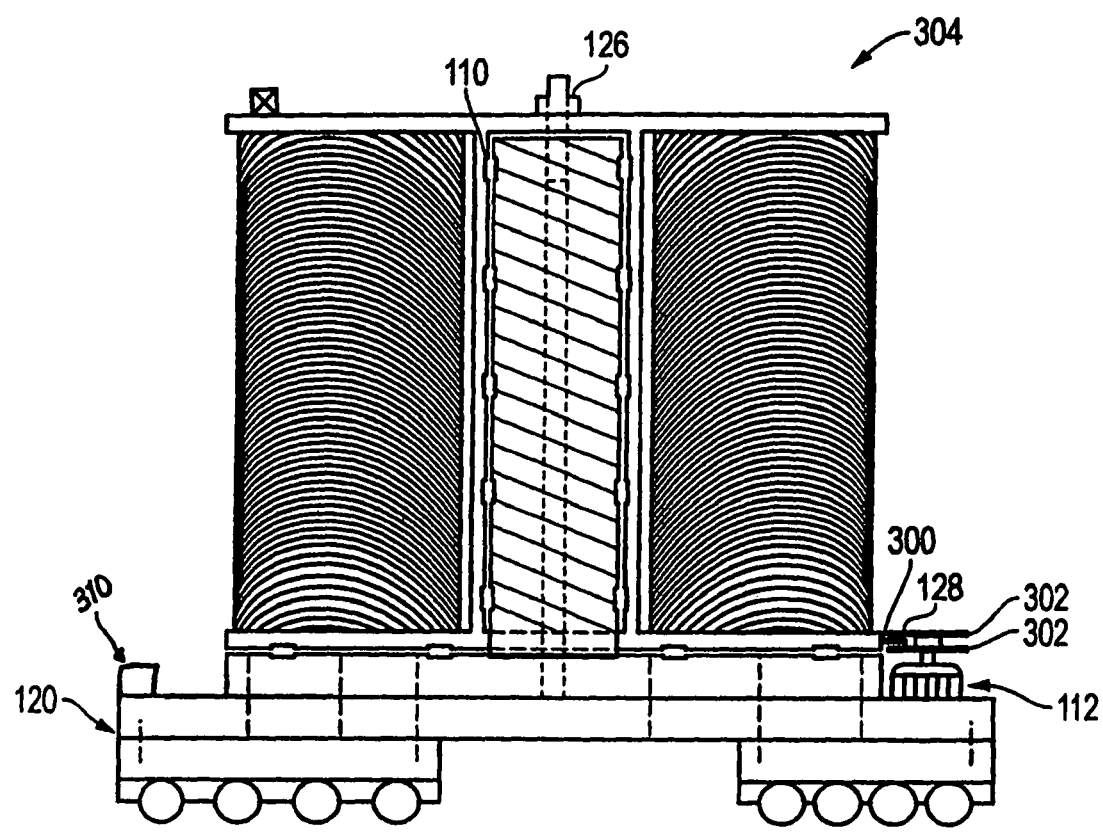
FIG. 3 is a schematic side view of a wind turbine according to one embodiment.

The surface 124, as shown in FIG. 1A, is the ground; however, it should be appreciated that the surface 124 may be any suitable surface for supporting the base 120 including, but not limited to, a trailer, a boat, a rail car as illustrated in FIG. 3, a top of a building, a top of a parking garage, a top of a stadium, offshore platforms, islands (man-made or otherwise) and the like.

The platform 122 typically provides the support for the weight of the turbine rotor 104. The platform 122 may include one or more magnets 110B which provide an opposing force against the one or more magnets 110A located on the bottom 116 of the turbine rotor 104, as will be described in more detail below. The base 120 and/or the platform 122 may extend the same radial distance from the axis 102 as the turbine rotor 104. Alternatively, the base 120 may extend a shorter radial distance from the axis 102 than the turbine rotor 104, or, in another alternative embodiment, may extend a longer radial distance from the axis 102 than the turbine rotor 104. It should be appreciated that the platform 122 may be any suitable shape capable of providing a vertical support surface for the turbine rotor 104.

The support shaft 118 of the turbine support 106 may provide for stabilization of the turbine rotor 104. The support shaft 118, as shown in FIGS. 1A and 1B is located radially inside the central axis 113 of the turbine rotor 104. FIG. 1A shows the support shaft 118 as a substantially solid shaft which is slightly smaller than the interior of the central axis 113 of the turbine rotor 104. Alternatively, as shown in FIG. 2, the support shaft 118 may define an opening that allows for an interior access way 202. The support shaft 118 allows the turbine rotor 104 to rotate in response to the wind while preventing the turbine rotor 104 from moving substantially in the direction perpendicular to the core axis 102. The support shaft 118 may include one or more magnets 110C which provide an opposing force against one or more magnets 110D located on the central axis 113 of the turbine rotor 104. The magnet 110C located on the support shaft 118 may act to stabilize the turbine rotor as will be discussed in more detail below.

The wind turbine 100 may include a connector 126, shown schematically in FIGS. 1A and 3. The connector 126 may secure the turbine rotor 104 to the turbine support 106 while allowing the turbine rotor 104 to rotate. FIG. 1A shows the connector 126 as a pin type connection which is secured to the support shaft 118 and penetrates an opening in the top 114 of the turbine rotor 104. A head of the pin may rest on the top 114 of the turbine rotor 104. The opening may be large enough to not engage the pin as the turbine rotor 104 rotates about the turbine support 106. The head may simply provide an upward travel limit for the turbine rotor 104. Thus, typically the turbine rotor 104 may not engage the connector 126; however, in the event that the turbine rotor 104 lifts off of the turbine support 106, the head will stop it from becoming detached from the wind turbine 100. It should be appreciated that any suitable arrangement for securing the turbine rotor 104 to the turbine support 106 may be used.

The one or more sets of magnets 110C, 110D reduce friction between the turbine support 106 and the turbine rotor 104 by creating a space between the turbine support 106 and the turbine rotor 104 due to the opposing forces of the magnets. The magnets replace the role of roller bearings in prior wind turbines. The one or more magnets 110A, 110B positioned on the bottom 116 of the turbine rotor 104 and the platform 122 of the turbine support may include one or more levitation magnets and one or more stabilization magnets. The levitation magnets supply an opposing force between the bottom 116 of the turbine rotor 104 and the platform 122. The opposing force created by the levitation magnets may create a force on the turbine rotor 104 substantially opposite to a gravitational force on the turbine rotor 104. The levitation magnets can provide a large enough opposing force to lift the turbine rotor 104 off of the platform 122 thereby eliminating friction between the platform 122 and the turbine rotor 104. Specifically, a space may be created between the platform 122 and the bottom 116 of the turbine rotor 104 as a result of the opposing force. Alternatively, the opposing force created by the levitation magnets may only negate a portion of the gravitational force, so that the friction force between the platform 122 and the turbine rotor 104 is reduced.

The stabilization magnets 110D, 110C, as shown in FIG. 1A, are designed to provide an opposing force between the central axis 113 and the support shaft 118. The stabilization magnets may be located directly on the interior of the central axis 113 and the exterior of the support shaft 118. The stabilization magnets may maintain a space between the inner diameter of the central axis 113 and the outer diameter of the support shaft 118. Therefore, during rotation of the turbine rotor 104 there may be no friction between the central axis 113 of the turbine rotor 104 and the support shaft 118. It should be appreciated that other means of reducing the friction between central axis 113 and the support shaft 118 may be used including, but not limited to, a bearing.

Friction may be eliminated between the turbine rotor 104 and the turbine support 106 using both the levitation magnets and stabilization magnets. The one or more sets of magnets 110 may be any magnets suitable for creating an opposing force including but not limited to a permanent magnet, an electromagnet, permanent rare earth magnet, ferromagnetic materials, permanent magnet materials, magnet wires and the like. A permanent rare earth magnet may include samarium cobalt (SmCo) and/or neodymium (Nd-FEB). Further, the one or more magnets 110 may be arranged in any suitable manner so long as they reduce the friction between the turbine rotor 104 and the turbine support 106. FIGS. 1A, 2, and 3 show the one or more sets of magnets 110 as a series of permanent magnets spaced apart from one another; however, it should be appreciated that an electromagnet may be used in order to magnetize a portion of the turbine rotor 104 and the turbine support 106. Further, in an alternative embodiment, a portion of the turbine rotor 104 and the turbine support 106 may be magnetized to provide the opposing force. Thus in an alternative embodiment, the entire platform 122 and/or base 120 may be magnetized to provide an opposing force on the bottom 116 of the turbine rotor 104 which may also be magnetized.

The blades 108 may be any suitable blade capable of converting the kinetic energy of the wind into mechanical energy. In one embodiment, the blades 108 are made from a thin metal material, however, it should be appreciated that blades may be any suitable material including, but not limited to, a poly-carbon, a fabric, a synthetic material.

The blades 108 may be fixed to the turbine rotor 104 in a static position. Alternatively, the blades 108 may be moveably attached to the turbine rotor 104. For example, a connection between the blades 108 and the turbine rotor 104 may allow the angle of the blades 108 to adjust in relation to the turbine rotor 104. The angle may adjust manually or automatically in response to the wind conditions at the location.

The turbine rotor 104 provides mechanical energy for the one or more generators 112 as the turbine rotor 104 rotates about the axis 102. In one embodiment, a generator gear 128 is moved by a portion of the turbine rotor 104 as the turbine rotor 104 rotates. As shown in FIG. 1A, an outer edge 130 of the gear 128 may be proximate an edge of the turbine rotor 104. In one embodiment, the gear 128 engages the turbine rotor 104 with a traditional gear and/or transmission device capable of transferring rotation to the gear 128.

In an additional or alternative embodiment, the gear 128 may be a magnetic gear. The magnetic gear is a gear that moves in response to a magnetic force between the turbine rotor 104 and the magnetic gear. At least one of the gear 128 and/or the proximate portion of the turbine rotor 104 may be magnetized. Thus, as the turbine rotor 104 rotates proximate the gear 128 the magnetic force moves the gear 128 in response to the turbine rotor 104 rotation. The magnetic gear allows the turbine rotor 104 to rotate the gear 128 without any friction between the two components.

FIG. 3 shows the magnetic gear according to one embodiment. A rotor gear component 300 may protrude from the outer surface of the turbine rotor 104. The rotor gear component 300 may extend beyond the outer diameter of the turbine rotor 103 and rotate with the turbine rotor 104. As shown, the rotor gear component 300 is a plate extending around an outer diameter of the turbine rotor 104; however, it should be appreciated that any suitable configuration for the rotor gear component 300 may be used. The gear 128 may include one or more gear wheels 302 which extend from the gear to a location proximate the rotor gear component 300. As shown in FIG. 3, there are two gear wheels 302 which are located above and below a portion of the rotor gear component 300. As the turbine rotor 104 rotates, the rotor gear component 300 rotates. A portion of the rotor gear component 300 may pass in between two portions of one or more gear wheels 302. Any of the rotor gear component 300, and the one or more gear wheels 302 may be magnetized. The type of magnet used to produce the magnetic force for the magnetic gear may be any magnet described herein. The magnetic force between the components of the magnetic gear move the gear 128 thereby generating electricity and/or power in the generator 112.

The generators 112 may be located at various locations proximate the turbine rotor 104. FIG. 1B shows three generators 112 located around the perimeter of the turbine rotor 104. It should be appreciated that any suitable number of generators 112 may be used around the perimeter of the turbine rotor 104. Further, the generator 112 may be located at other locations proximate the turbine rotor including, but not limited to, proximate the shaft 102 of the turbine rotor, in line with the axis 102 above and/or below the turbine rotor 104, and the like.

The generator 112 may be any suitable generator for converting mechanical energy into power including, but not limited to, electric generators, motors, linear generators, and the like.

In one embodiment, one or more of the generators 112 is a linear synchronous motor (LSM). The LSM motor may advance the turbine support 120 and may double as a braking system.

The power generated by the generator may be fed directly to a power grid. Further, it should be appreciated that the power may alternatively or additionally be used on site or stored. The stored power may be used at a later date when demand for the power is higher. Examples of power storage units include, but are not limited to, batteries and generating stored compressed air, a flywheel system, a magnetically levitated flywheel system, hydraulic accumulators, capacitors, super capacitors, a combination thereof, and the like.

The one or more magnets 110 reduce and potentially eliminate friction between the turbine rotor 104 and the turbine support 106. This friction reduction allows the scale of the wind turbine 100 to be much larger than a conventional wind turbine. In a conventional wind turbine the larger the wind turbine, the more friction is created between the moving parts. The amount of friction eventually limits the effective size of a conventional wind turbine. In one example, the wind turbine may have an outer diameter of 1000 ft. Known wind turbines prior to this invention typically have diameters of up to approximately 300 ft. In a preferred embodiment, a fixed wind turbine 200, as shown in FIG. 2, has an outer diameter of about 600 ft. and is capable of producing more than 1 GWh of power. A smaller portable wind turbine 304, shown in FIG. 3, may be adapted to transport to remote locations. The portable version may have a diameter of greater than 15 ft. and a height of greater than 15 ft. In a preferred embodiment, the portable version has an outer diameter within a range of about 30 ft. to 120 ft. and a height within a range of about 25 ft. to 100 ft. and is capable of producing 50 MWh of power. It should be appreciated that the size and scale of the wind turbine may vary depending on a customers need. Further, it should be appreciated that more than one wind turbine may be located on the same portable transports system, and/or at one fixed location.

Although, the overall size of the wind turbine 100 may be much larger than a traditional wind turbine, the amount of power one wind turbine 100 produces is much larger than a traditional wind turbine. Therefore, the total land use required for the wind turbine 100 may be reduced over that required for a traditional wind farm.

The embodiment shown in FIG. 2 shows the fixed wind turbine 200, according to one embodiment. The fixed wind turbine 200 may have a turbine support 106 which extends over the turbine rotor 104. The one or more magnets 110 may be on an upper portion 201 of the turbine support 106 in addition to the locations described above.

The fixed wind turbine 200 may include an interior access way 202, according to one embodiment. It should be appreciated that any of the wind turbines 100, 200 and 304 may include an interior access way 202. The interior access way 202 allows a person to access the interior of the turbine support 104. The interior access way 202 may extend above and/or below the turbine rotor 104 in order to give the person access to various locations in the fixed wind turbine 200. The interior access way 202 may allow a person to perform maintenance on the magnets 110 and other components of the wind turbine 100, 200, and 304. Further, the interior access way 202 may have a means for transporting persons up and down the interior access way 202. The means for transporting persons may be any suitable item including, but not limited to, an elevator, a cable elevator, a hydraulic elevator, a magnetic elevator, a stair, a spiral staircase, an escalator, a ladder, a rope, a fireman pole, a spiral elevator, and the like. The spiral elevator is an elevator that transports one or more persons up and down the interior access way 202 in a spiral fashion around the interior of the interior access way 202. For example, the spiral elevator may travel in a similar path to a spiral staircase. The elevator and/or spiral elevator may use magnetic levitation to lift the elevator up and down.

The upper portion 201 of the turbine support 106 may include an observation deck 204. The observation deck 204 may extend around the perimeter of the wind turbine 100, 200 and/or 304, thereby allowing a person to view the surrounding area from the observation deck 204. The observation deck 204 may also serve as a location for an operator to control various features of the wind turbine, as will be discussed in more detail below.

The upper portion 201 of the turbine support 106 may further include a helipad 206. The helipad 202 allows persons to fly to the wind turbine 100, 200, and/or 304 and land a helicopter (not shown) directly on the wind turbine. This may be particularly useful in remote locations, or locations with limited access including, but not limited to, the ocean, a lake, a industrial area, a tundra, a desert, and the like.

The upper portion 201 of the turbine support 106 may further have one or more cranes 208. The cranes 208 allow an operator to lift heavy equipment. The crane 208 may be a tandem crane capable of rotating around the diameter of the wind turbine. The crane may assist in the construction of the wind turbine 100.

Figure 4:
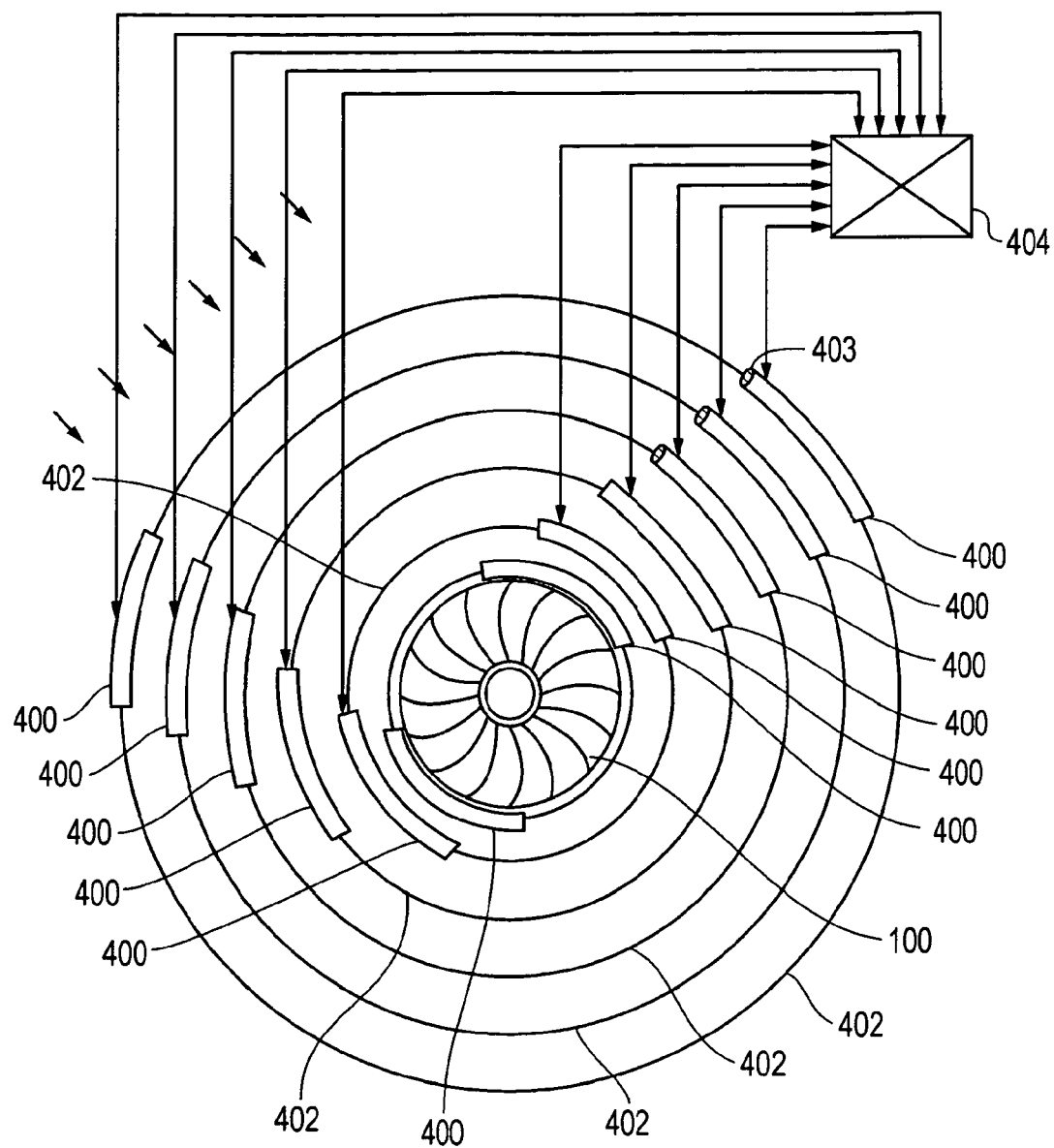
FIG. 4 is a schematic top view of a wind turbine according to one embodiment.

FIG. 4 shows a top view of the wind turbine 100 in conjunction with one or more wind compressors 400. The wind compressors 400 are each an obstruction configured to channel the wind toward the wind turbine 100, creating a venturi effect as the winds converge toward the wind turbine 100. This Venturi effect on the wind turbines increases the rpms or rotation speed of the rotors which translates into increased electrical energy produced by the generators 112 (FIG. 1A). This increase in wind energy and force upon the turbine blades 108 is thus translated from the wind turbine 500 to the generator 112 resulting in an increased output of electricity. This invention 400 increases the efficiency and ultimate output of the wind turbine 100 up to or beyond 1000-2000 megawatts per hour (MWh) or 1 gigawatt (GWh) per hour. Known wind turbines produce between 2-4 MGW/hour.

The wind compressor 400 may be any suitable obstruction capable of re-channeling the natural flow of wind towards the wind turbines 100, 400. Suitable wind compressors include, but are not limited to, a sail, a railroad car, a trailer truck body, a structure, and the like. Structurally the obstructions comprises a shape and size to capture and redirect a body of wind towards the wind turbine. In one embodiment an obstruction such as a sail, which comprises a large area in two dimensions but is basically a flat object, must be anchored to avoid displacement by the force of the wind. Other obstructions, such as the rail road car or trailer truck, should have enough weight to avoid wind displacement.

Each of the wind compressors 400 may be moveably coupled to a transporter 403, or transport device to move the compressor 400 to a location or position that captures the wind flow as the direction of wind changes and directs the wind flow towards the wind turbine. The transporter may be any suitable transporter 403 capable of moving the wind compressor 400 including, but not limited to, a locomotive to move a rail car, a automobile, a truck, a trailer, a boat, a Sino trailer, a heavy duty self propelled modular transporter 403 and the like. Each of the transporters 403 may include an engine or motor capable of propelling the transporter 403. The location of each of the wind compressors 400 may be adjusted to suit the prevailing wind pattern at a particular location. Further, the location of the wind compressors 400 may be automatically and/or manually changed to suit shifts in the wind direction. To that end, the transporter 403 may include a drive member for moving the transporter 403. The transporter 403 may be in communication with a controller, for manipulating the location of each of the transporters 403 in response to the wind direction. A separate controller may be located within each of the transporters 403.

One or more pathways 402, shown in FIG. 4, may guide transporters 403 as they carry the wind compressors 400 to a new location around the wind turbine 100. The one or more pathways 402 may be any suitable pathway for guiding the transporters including, but not limited to, a railroad, a monorail, a roadway, a waterway, and the like. As shown in FIG. 4, the one or more pathways 402 are a series of increasingly larger circles which extend around the entire wind turbine 100. It should be appreciated that any suitable configuration for the pathways 402 may be used. As described above, the size of the wind turbine 100 may be greatly increased due to the minimized friction between the turbine rotor 104 and the turbine support 106. Thus, the pathways 402 may encompass a large area around the wind turbine 100. The wind compressors 400 as a group may extend out any distance from the wind turbine 100, only limited by the land use in the area. Thus, a large area of wind may be channeled directly toward the wind turbine 100 thereby increasing the amount of wind engaging the blades 108.

In one aspect of this invention, the controller may be a single controller 404 capable of controlling each of the transporters 403 from an onsite or remote location. The controller(s) 404 may be in wired or wireless communication with the transporters 403. The controller(s) 404 may initiate an actuator thereby controlling the engine, motor or drive member of the transporter 403. The controller(s) may comprise a central processing unit (CPU), support circuits and memory. The CPU may comprise a general processing computer, microprocessor, or digital signal processor of a type that is used for signal processing. The support circuits may comprise well known circuits such as cache, clock circuits, power supplies, input/output circuits, and the like. The memory may comprise read only memory, random access memory, disk drive memory, removable storage and other forms of digital memory in various combinations. The memory stores control software and signal processing software. The control software is generally used to provide control of the systems of the wind turbine including the location of the transporters 403, the blade direction, the amount of power being stored versus sent to the power grid, and the like. The processor may be capable of calculating the optimal location of each of the wind compressors based on data from the sensors.

One or more sensors 310, shown in FIG. 3, may be located on the wind turbines 100, 200 and/or 304 and/or in the area surrounding the wind turbines. The sensors 310 may detect the current wind direction and/or strength and send the information to a controller 312. The sensors 310 may also detect the speed of rotation of the turbine rotor 104. The controller 312 may receive information regarding any of the components and/or sensors associated with the wind turbines. The controller 312 may then send instructions to various components of the wind turbines, the wind compressors and/or the generators in order to optimize the efficiency of the wind turbines. The controller 312 may be located inside the base of the tower, at the concrete foundation, a remote location, or in the control room at the top of the tower.

It should be appreciated that the wind compressors may be used in conjunction with any number and type of wind turbine, or wind farms. For example, the wind compressors 400 may be used with one or more horizontal wind turbines, traditional vertical wind turbines, the wind turbines described herein and any combination thereof.

Preferred methods and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

The invention claimed is:

1. A wind turbine, comprising:
a turbine support having a lower portion and a vertical portion;
said lower portion of said turbine support aligned along and extending horizontally outward from a core axis, an upper surface of said lower portion having first magnet means positioned thereon aligned along said core axis;
said vertical portion of said turbine support being cylindrically shaped and having second magnet means positioned thereon aligned along said core axis;
a turbine rotor having a central portion and a lower portion;
said central portion of said turbine rotor configured to concentrically receive said vertical portion of said turbine support therein, said vertical portion being radially inside said central portion, said turbine rotor aligned about said core axis and rotatable thereabout, and having third magnet means positioned on said central portion along said core axis, said third magnet means aligned opposing said second magnet means, the opposition creating and maintaining a first space therebetween;
said lower portion of said turbine rotor aligned along and extending outward from said core axis, a lower surface of said lower portion having fourth magnet means positioned thereon aligned along said core axis, said fourth magnet means aligned opposing said first magnet means, the opposition creating and maintaining a second space therebetween;
a plurality of blades coupled to said turbine rotor; and at least one generator configured to generate electric power from the movement of said turbine rotor.

2. The wind turbine according to claim 1, wherein said turbine rotor covers said vertical portion of said turbine support.

3. The wind turbine according to claim 1, wherein said turbine rotor does not cover said vertical portion of said turbine support.

4. The wind turbine according to claim 3, wherein said turbine support further comprises an upper portion aligned along and extending outward from said core axis, said upper portion extending radially over said turbine rotor.

5. The wind turbine according to claim 1, wherein said turbine rotor is integrally connected to said plurality of blades.

6. The wind turbine according to claim 1, wherein said turbine rotor is configured about said core axis in a non-circular pattern.

7. The wind turbine according to claim 1, wherein said lower portion of said turbine support and said turbine rotor extend substantially equally from said core axis.

8. The wind turbine according to claim 1, wherein said lower portion of said turbine support and said turbine rotor extend unequally from said core axis.

9. The wind turbine according to claim 1, wherein said vertical portion of said turbine support is substantially solid.

10. The wind turbine according to claim 1, wherein said vertical portion of said turbine support has an interior portion.

11. The wind turbine according to claim 10, wherein said interior portion comprises an access way, and, further comprising:
a transportation device within said interior portion.

12. The wind turbine according to claim 11, wherein said transportation device is selected from the group consisting of an elevator, a cable elevator, a hydraulic elevator, a magnetic elevator, a stairway, a spiral stairway, an escalator, a ladder, a rope, a fireman pole, a spiral elevator, a trailer and combinations thereof.

13. The wind turbine according to claim 1, wherein said wind turbine has a roof portion thereof with equipment thereon, said equipment selected from the group consisting of an observation deck, a helipad, a crane and combinations thereof.

14. The wind turbine according to claim 1, further comprising:
a connector, said connector securing said turbine rotor to said vertical portion of said turbine support.

15. The wind turbine according to claim 14, wherein said connector is a pin-type connector, said turbine rotor rotating thereabout.

16. The wind turbine according to claim 14, wherein said connector is configured to govern the upward movement of said turbine rotor caused by levitation.

17. The wind turbine according to claim 1, further comprising a bearing substantially within said first space.

18. The wind turbine according to claim 1, wherein said first and fourth magnet means comprise levitation magnets that provide repulsive forces to lift said turbine rotor off said turbine support, creating said first space.

19. The wind turbine according to claim 18, wherein said first and fourth magnet means further comprise stabilization magnets.

20. The wind turbine according to claim 1, wherein said first and fourth magnet means provide repulsive forces to lift said turbine rotor off said turbine support, said repulsive forces in excess of the gravitational forces present.

21. The wind turbine according to claim 1, wherein said first and fourth magnet means provide repulsive forces to partially lift said turbine rotor off said turbine support, said repulsive forces being less than the gravitational forces present.

22. The wind turbine according to claim 1, wherein said second and third magnet means comprise stabilization magnets.

23. The wind turbine according to claim 1, wherein said first, second, third and fourth magnet means are magnets selected from the group consisting of permanent magnets, electromagnets, permanent rare earth magnets, samarium cobalt magnet materials, neodymium magnet materials, ferromagnetic materials, permanent magnetic materials, magnetic wires, and combinations thereof.

24. The wind turbine according to claim 1, wherein portions of said turbine rotor and said turbine support are magnetized.

25. The wind turbine according to claim 24, wherein said turbine rotor and said turbine support are magnetized.

26. The wind turbine according to claim 1, wherein said plurality of blades are composed of a material selected from the group consisting of thin metal, poly-carbon, fabric, synthetic and combinations thereof.

27. The wind turbine according to claim 1, wherein said plurality of blades are affixed in a static position on said wind turbine.

28. The wind turbine according to claim 1, wherein plurality of blades are moveably attached to said wind turbine.

29. The wind turbine according to claim 1, further comprising:
a generator gear.

30. The wind turbine according to claim 29, wherein said generator gear is selected from the group consisting of a traditional gear, a transmission gear, a magnetic gear and combinations thereof.

31. The wind turbine according to claim 29, wherein said generator gear and a portion of said turbine rotor proximate thereto are magnetized.

32. The wind turbine of claim 1, further comprising a plurality of generators disposed proximate said turbine rotor, said generators disposed at positions selected from the group consisting of along the perimeter of the turbine rotor, above said turbine rotor along said core axis, below said turbine rotor along said core axis, and combinations thereof.

33. The wind turbine according to claim 1, wherein at least one generator is selected from the group consisting of electric generators, motors, linear generators, linear synchronous generators and combinations thereof.

34. The wind turbine according to claim 1, wherein the energy generated by said at least generator is utilized in a manner selected from the group consisting of (1) feeding to a power grid attached to said wind turbine, (2) storage in batteries, (3) storage in compressed air, (4) storage in a flywheel, (5) storage in a magnetically levitated flywheel, (6) storage in hydraulic accumulators, (7) storage in capacitors, (8) storage in super capacitors, and combinations thereof.

35. The wind turbine according to claim 1, further comprising:
at least one sensor located proximate said wind turbine, wherein said at least one sensor is selected from the group consisting of wind director detectors, wind strength detectors, turbine rotational speed detectors, and combinations thereof.

36. The wind turbine according to claim 1, further comprising:
at least one controller, said controller being wired and/or wireless; and
at least one actuator for controlling said wind turbine via said at least one controller.

37. The wind turbine according to claim 1, further comprising:
at least one wind compressor for channeling wind to said wind turbine.

38. The wind turbine according to claim 37, wherein said at least one wind compressor is selected from the group consisting of sails, railroad cars, trailer truck bodies, a structure, and combinations thereof.

39. The wind turbine according to claim 37, further comprising:
at least one transporter moveably coupled to at least one of said wind compressors; and
at least one pathway along which at least one of said transporters move.

40. A method for generating electricity, comprising:
lifting a vertical turbine rotor off of a turbine support using a first plurality of opposed said lifting creating a first space between the vertical turbine rotor and the turbine support;
aligning said vertical turbine rotor along a core axis using a second plurality of opposed magnets, said aligning creating a second space between the vertical turbine rotor and the turbine support;
engaging one or more blades coupled to the vertical turbine rotor with wind;
rotating the vertical turbine rotor relative to the turbine support as the one or more blades engage the wind; and
converting the mechanical energy of the moving vertical turbine rotor into electric power using a generator.

41. A wind turbine comprising:
a turbine support, said turbine support comprising a base and a substantially cylindrical vertical member;
a turbine rotor, said turbine rotor comprising a receiving portion to receive said substantially cylindrical vertical member therein, and a circular portion thereabout;
first magnet means disposed in opposition along aid base and along said circular portion, forming a first space therebetween;
second magnet means disposed in opposition along said substantially cylindrical vertical member and within said receiving portion, forming a second space therebetween;
at least one blade connected to said turbine rotor; and
energy conversion means to convert the motion of said turbine rotor into another form of energy.

* * * * *